US011872601B2

(12) United States Patent
Asara

(10) Patent No.: US 11,872,601 B2
(45) Date of Patent: Jan. 16, 2024

(54) PORTABLE MACHINE AND METHOD FOR WASHING AND DRYING CARTRIDGE CASES FOR GUN OR RIFLE

(71) Applicant: Roberto Asara, Arzachena (IT)

(72) Inventor: Roberto Asara, Arzachena (IT)

( * ) Notice: Subject to any disclaimer, the term of this patent is extended or adjusted under 35 U.S.C. 154(b) by 0 days.

(21) Appl. No.: 16/971,914

(22) PCT Filed: Feb. 22, 2019

(86) PCT No.: PCT/IB2019/051464
§ 371 (c)(1),
(2) Date: Aug. 21, 2020

(87) PCT Pub. No.: WO2019/162901
PCT Pub. Date: Aug. 29, 2019

(65) Prior Publication Data

US 2021/0379631 A1 Dec. 9, 2021

(30) Foreign Application Priority Data

Feb. 23, 2018 (IT) ........................ 102018000002846

(51) Int. Cl.
*B08B 3/04* (2006.01)
*B08B 3/06* (2006.01)
*F42B 33/10* (2006.01)

(52) U.S. Cl.
CPC ................ *B08B 3/044* (2013.01); *B08B 3/06* (2013.01); *F42B 33/10* (2013.01)

(58) Field of Classification Search
CPC . B08B 3/06; B08B 3/044; B08B 3/045; F24B 33/10; F24B 33/14
See application file for complete search history.

(56) References Cited

U.S. PATENT DOCUMENTS 1,396,456 A * 11/1921 Mueller .................. D06F 21/04 68/210
3,487,840 A 1/1970 Stenzel et al.
(Continued)

FOREIGN PATENT DOCUMENTS

CN 1556880 A 12/2004
CN 105518200 A 4/2016
(Continued)

OTHER PUBLICATIONS

International Search Report and Written Opinion for International Patent Application No. PCT/IB2019/051464, dated Jul. 4, 2019, 10 pages.

*Primary Examiner* — Michael E Barr
*Assistant Examiner* — Kevin G Lee
(74) *Attorney, Agent, or Firm* — Armstrong Teasdale LLP

(57) ABSTRACT

A portable machine for washing and drying cartridge cases for a gun or rifle includes a washing chamber having a cartridge case introduction opening, an inlet port, a discharging port, and a door configured to hermetically close the cartridge case introduction opening. The portable machine also includes a hydraulic circuit configured to allow washing liquid to enter the washing chamber via the inlet port to be discharged via the discharging port. The portable machine also includes a rotating body arranged in the washing chamber to rotate about an axis, the rotating body including a movement element. The movement element protrudes into the washing chamber and is configured to repeatedly lift and release the cartridge cases in the washing chamber during rotation of the rotating body. The portable machine also includes an operating motor, and a drying device arranged to dry the cartridge cases in the washing chamber.

9 Claims, 4 Drawing Sheets

(56) References Cited

U.S. PATENT DOCUMENTS

| | | | | |
|---|---|---|---|---|
| 4,078,943 | A | 3/1978 | Saurenman | |
| 5,507,232 | A | 4/1996 | Valdez | |
| 2004/0244438 | A1 | 12/2004 | North | |
| 2006/0225467 | A1 * | 10/2006 | Lim | D06F 25/00 68/19.2 |
| 2016/0101443 | A1 * | 4/2016 | Christensen | B08B 3/02 134/95.2 |

FOREIGN PATENT DOCUMENTS

| | | | |
|---|---|---|---|
| EP | 1985740 | A2 | 10/2008 |
| FR | 650223 | A * | 1/1929 |
| FR | 2859400 | A1 | 3/2005 |
| KR | 101204166 | B1 | 11/2012 |
| KR | 20160111749 | A | 9/2016 |
| RU | 2544145 | C1 | 3/2015 |
| WO | 9618464 | A1 | 6/1996 |

* cited by examiner

PORTABLE MACHINE AND METHOD FOR WASHING AND DRYING CARTRIDGE CASES FOR GUN OR RIFLE

CROSS-REFERENCE TO RELATED APPLICATIONS

This application is a National Phase filing of PCT International Application No. PCT/IB2019/051464, having an International Filing Date of Feb. 22, 2019, which claims the benefit of priority to Italian Patent Application No. 102018000002846, having a filing date of Feb. 23, 2018, each of which is hereby incorporated by reference in its entirety.

BACKGROUND

The present invention relates to the technical field of machines for washing various caliber cartridge cases for gun or rifle, and in particular it relates to a portable machine for washing and drying the aforesaid cartridge cases.

By way of non-limiting example, with reference to the technical field of sport shooting, there is the need to carry out an accurate cleaning of the cartridge cases, typically brass cartridge cases, after the end of the shooting session. Indeed, the cartridge cases collected after the shooting session may have a significant quantity of dirt due for example, both to the residues of gunpowder which are deposited on the inner and outer surface of the cartridge case, and to sand, soil, mud, etc., depending on the environment in which the shooting session is carried out. It is worth noting that an accurate cleaning of the cartridge cases allows to both extend the technical life of the reloading equipment and perform a correct loading of the cartridge, thus ensuring an effective operational cycle of the weapons.

It is known to use certain types of machines for cleaning the cartridge cases. A first type of machine for washing cartridge cases of the known art is the so-called needle cleaner, which comprises a vibrating container inside of which there are introduced the cartridge cases to be cleaned, the detergent and a multitude of small metal needles. The needle cleaner has the drawback that at the end of the wash cycle, the cartridge cases are to be collected by first separating the needles from the cartridge cases by means of magnets. Moreover, the cartridge cases are to be rinsed and then dried, typically in a household oven. A second type of machine of the known art for washing cartridge cases is the so-called ultrasonic cleaner, which also comprises a container inside of which there are introduced the cartridge cases with the detergent. With the exception that it does not provide the use of needles, the ultrasonic cleaner has similar drawbacks to those discussed above with reference to the needle cleaner. A third type of machine of the known art for washing cartridge cases is the so-called dry tumbler, which comprises a vibrating container inside of which there are introduced the cartridge cases with granules. The tumbler has the drawback of requiring relatively lengthy cleaning times, in the range of several hours, and of adequately cleaning the cartridge cases only on the outside. Moreover, the tumbler has the drawback of requiring the intervention of the operator, who should separate the cartridge cases from the granules, carry out the washing of the cartridge cases and then dry them, typically in a household oven. A further drawback of the tumbler is due to the fact that the granules used release silica powders which are harmful to health.

SUMMARY

The present invention proposes to provide a solution which is both capable of overcoming or at least partly reducing the drawbacks of the machines for washing cartridge cases described above with reference to the known art.

This and other objects are achieved by a portable machine for washing and drying various caliber cartridge cases for guns or rifles as defined in appended claim 1 in the most general embodiment thereof, and in the dependent claims in certain particular embodiments.

According to one aspect of the invention, it is an object of the present invention to provide a portable machine for washing and drying various caliber cartridge cases for guns or rifles which allows an effective washing of the cartridge cases and drying thereof to be carried out in an automatic manner.

According to a further aspect of the invention, in addition or alternatively to the aforesaid aspect, it is an object of the invention to provide a portable machine for washing and drying various caliber cartridge cases for guns or rifles which allows an effective washing of the cartridge cases and drying thereof to be carried out in an automatic manner with reduced times with respect to the machines described above with reference to the known art.

According to a further aspect of the invention, in addition or alternatively to the aforesaid aspects, it is an object of the invention to provide a portable machine for washing and drying various caliber cartridge cases for guns or rifles which allows an effective washing of the cartridge cases and drying thereof to be carried out in an automatic manner with a minimum impact on the environmental pollution.

It is a further aspect of the present invention to provide a method for washing and drying various caliber cartridge cases for guns or rifles as defined in claim 10.

BRIEF DESCRIPTION OF THE DRAWINGS

The invention will be better understood from the following detailed description of embodiments thereof, given by way of non-limiting example in relation to the accompanying drawings, in which.

Equal or similar elements are shown by the same numerals in the accompanying drawings.

DETAILED DESCRIPTION

Figure 1:
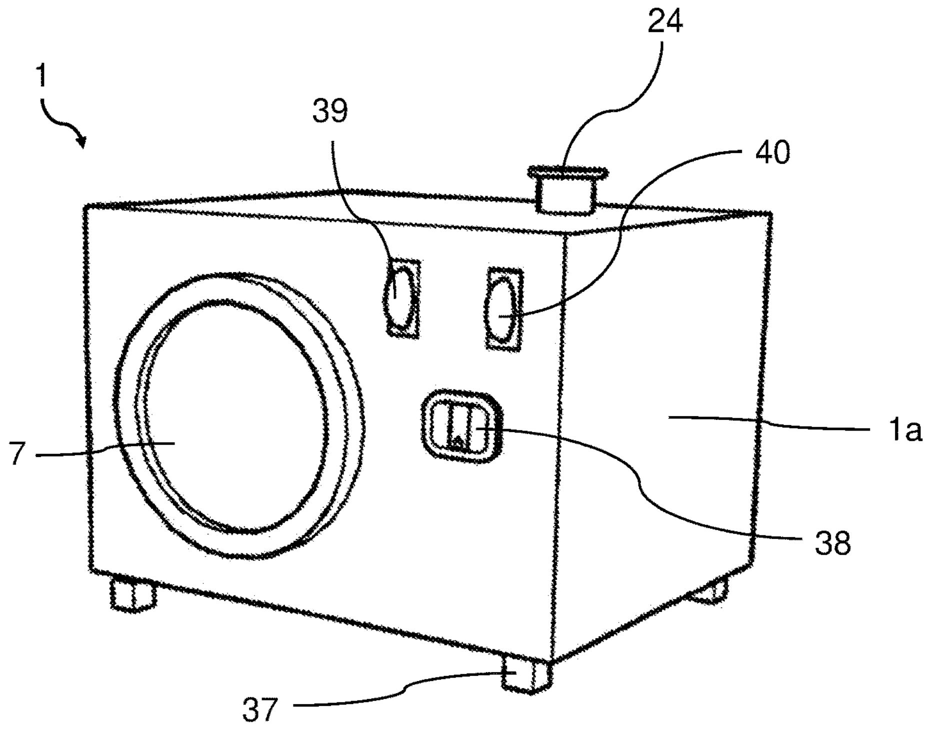
FIG. 1 shows a perspective view from the front side, of a portable machine for washing and drying various caliber cartridge cases for guns or rifles, according to a currently preferred embodiment.
Figure 2:
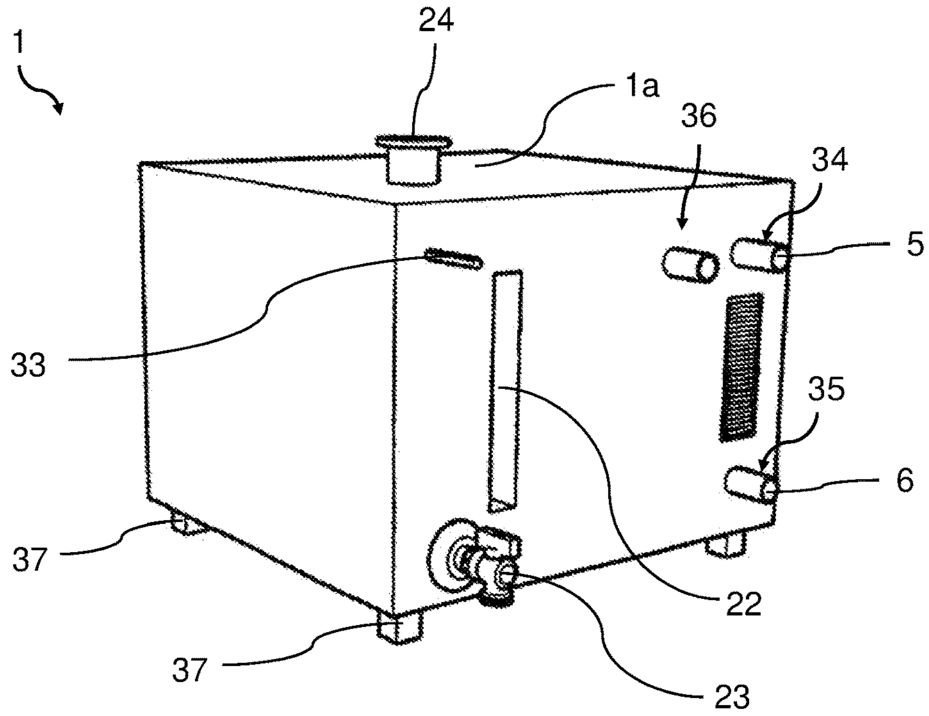
FIG. 2 shows a perspective view from the rear side, of the machine in FIG. 1.

FIG. 1 shows a portable machine for washing and drying various caliber cartridge cases for guns or rifles, according to a currently preferred embodiment, which is indicated as a whole with numeral 1. According to one embodiment, machine 1 is a hobby type machine. According to one embodiment, machine 1 is a machine for washing and drying brass cartridge cases. According to one embodiment, machine 1 is a machine with detergent recovery, as will be better understood below in the description. It is worth noting for the purposes of the present description that the term "portable" with respect to a machine for washing and drying cartridge cases is intended that the machine is easy to transport from one place to another by hand, i.e. without the aid of further tools. For the purposes of the present description, a portable machine also comprises a machine intended to be removably connected to a power supply network and/or water mains. According to one embodiment, machine 1 may wash about 400/500 cartridge cases or 800/900 cartridge cases in a same wash cycle, depending on the caliber of the cartridge cases.

With reference to FIGS. 3 to 6, an assembly 100 of components of machine 1 is shown. According to one embodiment, the assembly 10 is accommodated in an outer shell 1*a*, or casing 1*a*, of machine 1. According to one embodiment, machine 1 weighs about 7 kg when it is empty, i.e. with no liquids or cartridge cases therein. The outer shell 1*a* preferably is parallelepiped-shaped, or generally parallelepiped, having sizes equal to about 45 cm (length)×35 cm (width)×35 cm (height). Again with reference to FIGS. 3 to 6, machine 1 comprises a washing chamber 2 having a cylindrical side wall 3. The washing chamber 2 comprises an opening 4 for introducing cartridge cases, which preferably is a circular opening 4. Machine 1 comprises an inlet port 5 for a washing liquid and a discharging port 6 for the washing liquid. The washing liquid preferably is water. Machine 1 preferably comprises a perforated dispenser (not depicted) interposed between the inlet port 5 and the washing chamber 2. Machine 1 comprises a door 7, or closing member 7, configured to hermetically close opening 4 for introducing cartridge cases. Door 7 may be directly coupled to the washing chamber 2 or to the outer shell 1*a*. According to one embodiment, door 7 has a clear inspection window with such an extension as to allow to view and control the washing steps. Machine 1 comprises a hydraulic circuit 8 operatively connected to the washing chamber 2 and to said inlet and discharging ports 5, 6. The hydraulic circuit 8 is configured to allow the washing liquid to enter into the washing chamber 2 from said inlet port 5, and the washing liquid extracted from the washing chamber 2 to be discharged by means of said discharging port 6.

Figure 3:
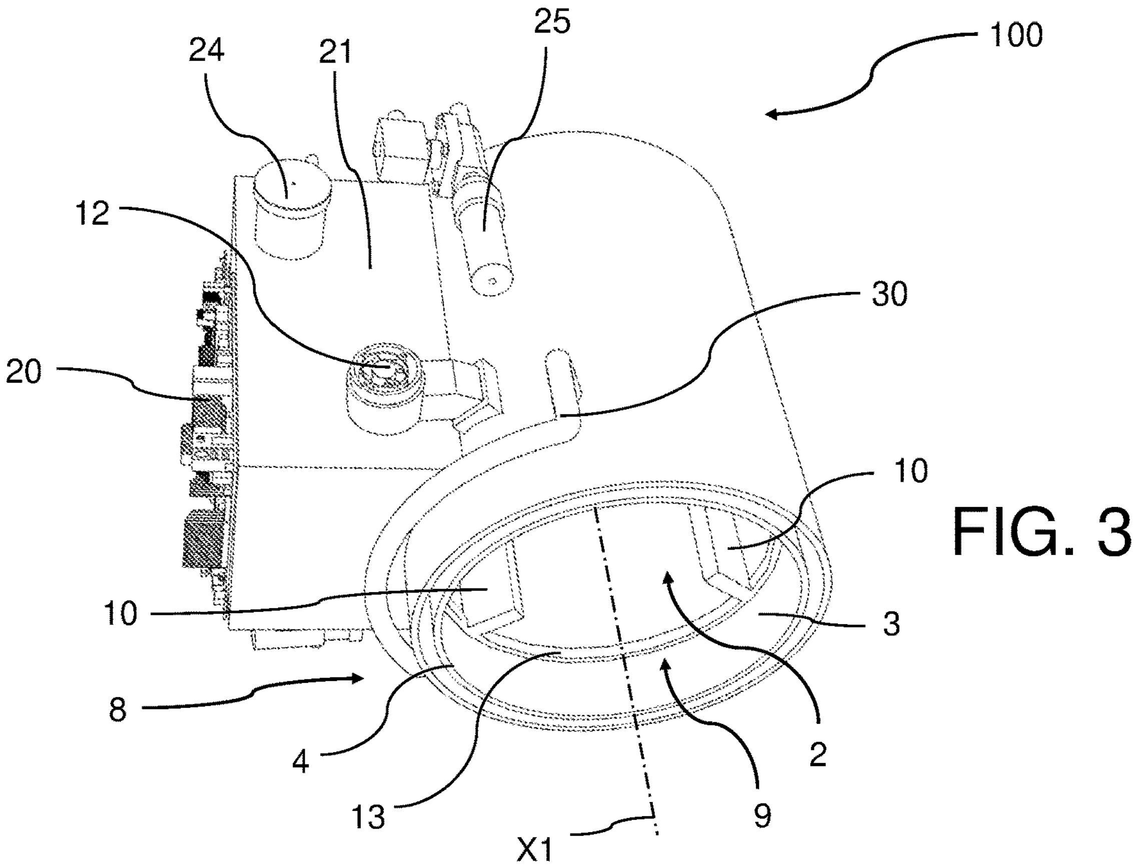
FIG. 3 shows a top perspective view from the front side, of an assembly of components of the machine in FIG. 1.
Figure 7:
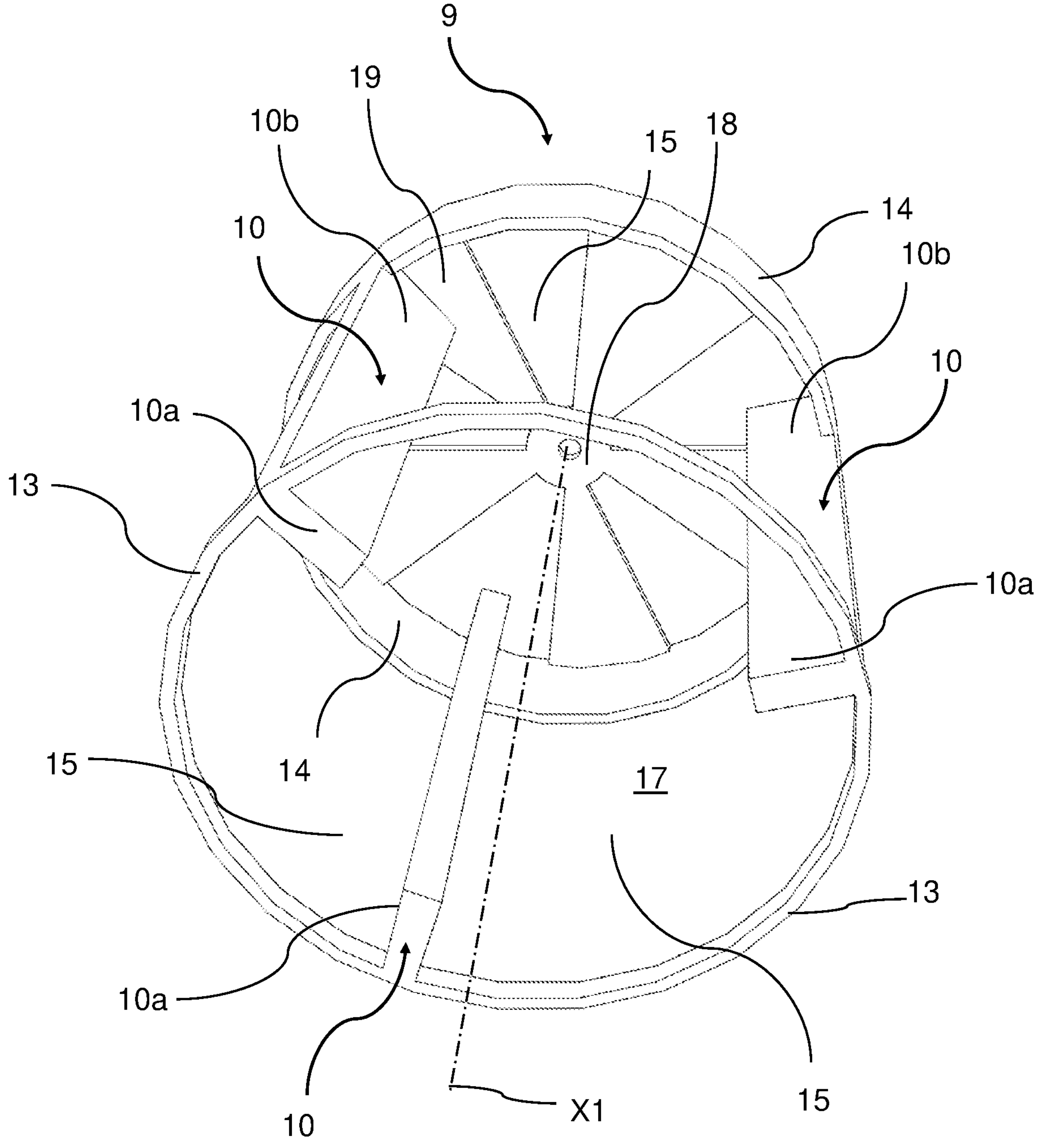
FIG. 7 shows a perspective view from the front side, of a component of the assembly in FIG. 3.

With reference for example, to FIGS. 3 and 7, machine 1 comprises a rotating body 9 arranged in the washing chamber 2. The rotating body 9 is arranged to rotate about a rotation axis X1 and advantageously comprises at least one cartridge case movement element 10 which is integral in rotation with the rotating body 9. According to one embodiment, the rotating body 9 and the washing chamber 2 are coaxial. The at least one movement element 10 protrudes into the washing chamber 2 and is configured to repeatedly lift and release the cartridge cases in the washing chamber 2 during the rotation of the rotating body 9. Conveniently during the washing, the at least one movement element 10 allows the cartridge cases to be repeatedly lifted and released, causing them to fall back into the washing liquid. Thereby, an optimal washing both of the outer surface and of the inner surface of the cartridge cases may be obtained. Indeed, due to the at least one movement element 10, the cartridge cases may be filled with and emptied of the washing liquid and/or detergent so as to also allow an optimal washing of the inner surface of the cartridge cases. To this end, it is worth noting that the cleaning of the inner surface of the cartridge cases is very important because it affects for example, the quantity of gunpowder which may be introduced into the cartridge case, the manner in which the gunpowder burns and the accuracy of the shot.

Figure 5:
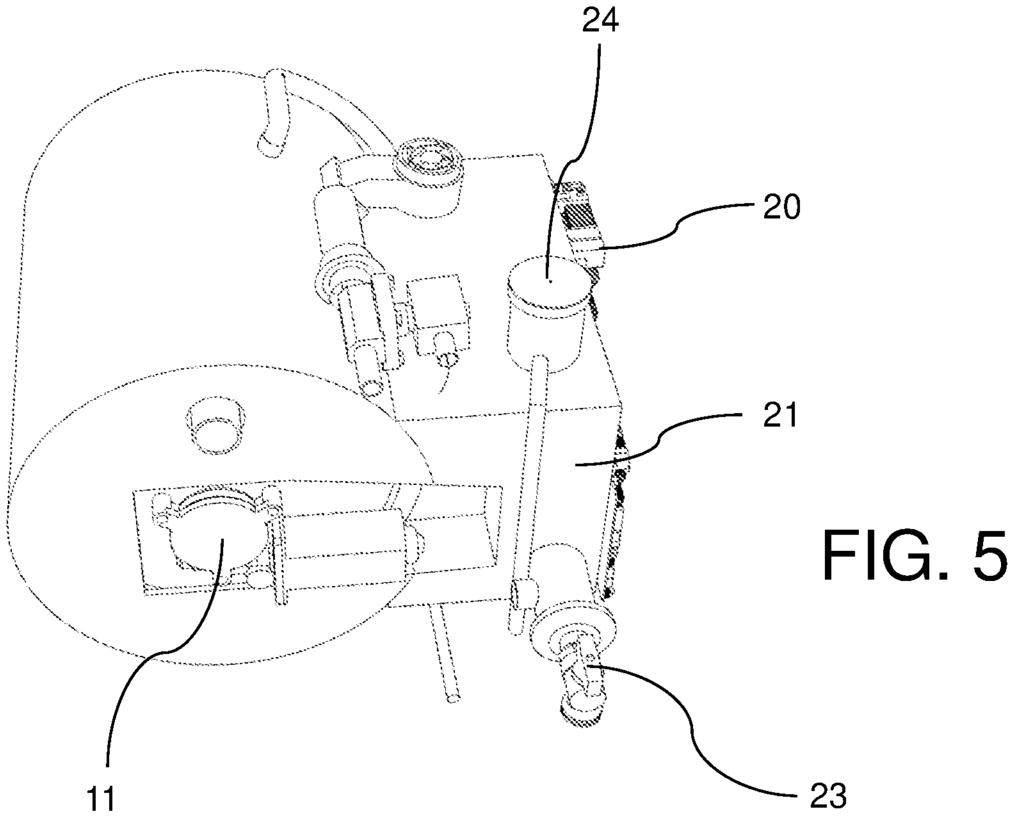
FIG. 5 shows a top perspective view from the rear side, of the assembly in FIG. 3.
Figure 6:
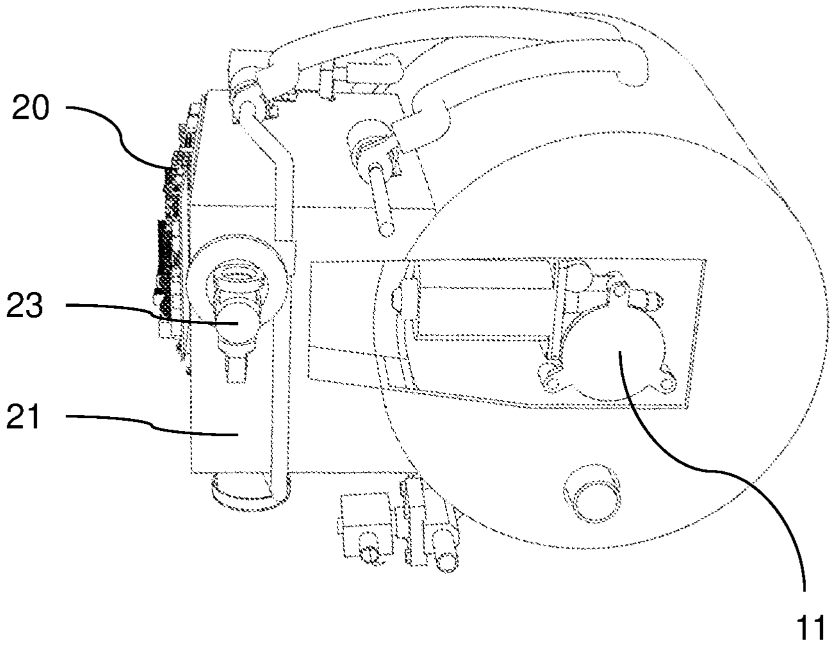
FIG. 6 shows a bottom perspective view and from the rear side, of the assembly in FIG. 3.

With reference to FIGS. 5 to 6, machine 1 comprises an operating motor 11 operatively connected to the rotating body 9 so as to allow the rotation of the rotating body 9 about the rotation axis X1 with respect to the washing chamber 2. According to one embodiment, the operating motor 11 is an electric motor 11, preferably an electric motor with variable revolutions per minute. According to one embodiment, motor 11 is a 12V electric motor. According to one embodiment, the rotation axis X1 is a horizontal axis. In this regard, it is worth noting that the term "horizontal" refers to the operating condition of machine 1.

Figure 4:
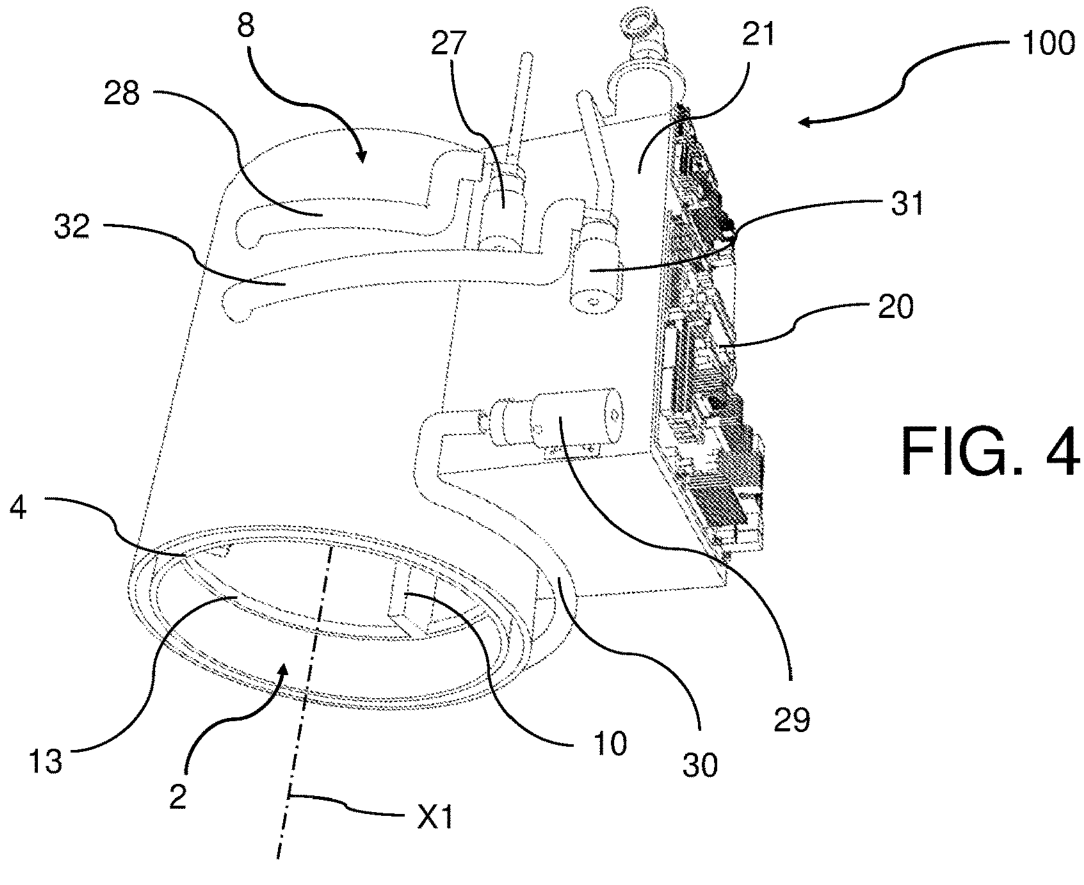
FIG. 4 shows a bottom perspective view from the front side, of the assembly in FIG. 3.

With reference to FIGS. 3 to 4, machine 1 comprises a drying device 12 arranged to dry the cartridge cases in the washing chamber 2. According to one embodiment, the drying device 12 comprises a heater 9. According to one embodiment, heater 9 allows the cartridge cases to be dried by means of forced ventilation. Heater 9 preferably comprises a fan and an electrical resistance, preferably a ceramic resistance, which allows the forced airflow generated by the fan to be heated. According to one embodiment, the heater may be installed in 220V operation so as to reduce the drying time and the consumption of power. In such a case, heater 9 may always be activated by a 12V control unit 20 (which is better described below in the description) by means of a monostable relay switch 16A with change-over contact. This allows the relay to remain excited up until the control unit 20 provides the 12V current, thus allowing the passage of the 220V current.

According to one embodiment, the at least one cartridge case movement element 10 is arranged adjacent to the cylindrical side wall 3 of the washing chamber 2, and more preferably it is in contact or substantially in contact with such a wall 3. It is worth noting that the at least one cartridge case movement element 10 remains adjacent to the cylindrical side wall 3 during the rotation of the rotating body 9. According to a preferred embodiment, the rotating body 9 comprises a plurality of cartridge case movement elements 10. In the embodiment provided by way example, the rotating body 9 comprises, in a non-limiting way, three movement elements 10 which are equally angularly spaced apart from one another about the rotation axis X1. In other words, the cartridge case movement elements 10 in the embodiment provided by way of example are angularly spaced apart from one another by 120° about axis X1. According to one embodiment, the at least one cartridge case movement element 10 comprises at least one longitudinal movement fin 10. The rotating body 9 in the example comprises, in a non-limiting way, three longitudinal movement fins 10. According to one embodiment, the fins 10 are straight fins which extend parallel to the rotation axis X1. According to one embodiment, the rotating body 9 comprises an opposite first and a second annular end portion 13, 14 which are arranged orthogonal with respect to the rotation axis X1. Although the end portions 13, 14 in FIG. 7 are depicted so as to have an apparently polygonal shape according to a preferred embodiment, the first and the second end portion 13, 14 each have a circular shape. According to one embodiment, the first annular end portion 13 delimits an end opening 17 which faces the cartridge case introduction opening 4. According to one embodiment, the end opening 17 is arranged close to the cartridge case introduction opening 4 and has such sizes as to allow the introduction of the cartridge cases into the washing chamber 2. According to one embodiment, the rotating body 9 comprises a reinforcing part 18, 20 connected to the second annular end portion 14. According to one embodiment, the reinforcing part 18, 20 comprises a middle portion 18 from which a plurality of spokes 19 radially extend with respect to axis X1, five spokes 19 in the non-limiting example, which connect to the second annular end portion 14. According to one embodiment, the second annular end portion 14 is operatively connected to motor 11. The second annular end portion 14 preferably substantially serves as pulley which may be operatively connected to motor 11 for the operation in rotation of the rotating body 9 about axis X1. The second annular end portion 9 may preferably be connected to motor 11 by means of a drive belt operatively interposed between the second annular end portion 14 and motor 11.

As may be noted in FIG. 7, according to one embodiment, each of the fins 10 is connected to the first and to the second annular end portion 13, 14. More preferably, each fin 10 comprises a first end portion 10*a* connected to the first annular end portion 13 and a second end portion 10*b*, opposite to the first end portion 10*a*, which is connected to the second annular end portion 14. According to a preferred embodiment, the fins 10 are welded or are made in a single piece with the annular end portions 13, 14. In addition to extending parallel to axis X1, each fin 10 preferably also extends radially with respect to axis X1 in a direction orthogonal to the longitudinal extension direction of fin 10. In other words, in the embodiment given by way of example in which the fins 10 have a parallelepiped shape, the longest faces of the parallelepiped extend along a direction parallel to axis X1, while the shortest faces of the parallelepiped extend along a radial direction with respect to axis X1, i.e. an orthogonal direction with respect to axis X1.

Again with reference to FIG. 7, according to a convenient embodiment, the rotating body 9 has a skeleton structure preferably having a generally cylindrical shape. According to a convenient embodiment, the rotating body 9 comprises a plurality of side through openings 15, each of which is delimited by a pair of fins 10, by the first annular end portion 13 and by the second annular end portion 14. Advantageously, the presence of the openings 15 allows the rotating body 9 to be crossed by a quantity of washing liquid and/or detergent which is such as to allow the cartridge cases to be effectively washed in particularly reduced times.

According to one embodiment, machine 1 comprises a control unit 20, preferably a cyclical control unit 20, which allows machine 1 to automatically carry out the various wash cycles. According to one embodiment, the control unit 20 is a 12V control unit.

According to one embodiment, the hydraulic circuit 8 comprises a tank 21 for a detergent. According to one embodiment, tank 21 is the only tank of machine 1. According to one embodiment, tank 21 is operatively connected to the washing chamber 2. Tank 21 preferably has a volume of about 4 l. Tank 21 is preferably arranged adjacent to the washing chamber 2. According to one embodiment, the detergent tank 21 comprises a graduated window 22 which is visible from the outside of the outer shell 1*a*. The graduated window 22 allows to check the detergent level. According to one embodiment, machine 1 comprises a discharge tap 23 operatively connected to tank 21 to empty spent detergent into a drain. Tank 21 is preferably provided with a tank cap 24, which preferably is accessible from the outside of shell 1*a*, which cap may be removed to allow the filling of tank 21 itself with the detergent.

According to one embodiment, the hydraulic circuit 8 comprises a valve 25 for the introduction of the washing liquid. Valve 25 preferably comprises a solenoid valve 25 for the introduction of the washing liquid, or solenoid 25 for the introduction of the washing liquid. Valve 25 is preferably operatively connected to the control unit 20. According to one embodiment, valve 25 is operatively connected to the inlet port 5 for the washing liquid.

According to one embodiment, the hydraulic circuit 8 comprises an extraction pump 27 for discharging the washing liquid from the washing chamber 2. According to one embodiment, the extraction pump 27 is operatively interposed between the washing chamber 2 and the discharging port 6. According to one embodiment, the extraction pump 27 is operatively connected to the control unit 20. According to one embodiment, the hydraulic circuit 8 comprises a tube 28 for discharging the washing liquid extracted from the washing chamber 2. Tube 28 is operatively interposed between the extraction pump 27 and the washing chamber. According to one embodiment, pump 27 is a 12V pump.

According to one embodiment, the hydraulic circuit 8 comprises a pump 29 for drawing the detergent. According to one embodiment, pump 29 allows to draw the detergent from tank 21 in order to introduce it into the washing chamber 2. According to one embodiment, the drawing pump 29 is operatively interposed between tank 21 and the washing chamber 2. According to one embodiment, the detergent drawing pump 29 is operatively connected to the control unit 20. According to one embodiment, the hydraulic circuit 8 comprises a tube 30 for introducing detergent into the washing chamber 2. Tube 30 is operatively interposed between the detergent drawing pump and the washing chamber 2. According to one embodiment, pump 29 is a 12V pump.

According to one embodiment, the hydraulic circuit 8 comprises a pump 31 for recovering the detergent. According to one embodiment, pump 31 allows to draw the detergent from the washing chamber 2 and reintroduce it into tank 21 for a successive reutilization thereof. According to one embodiment, pump 31 is operatively interposed between the washing chamber 2 and tank 21. According to one embodiment, the detergent recovery pump 31 is operatively connected to the control unit 20. According to one embodiment, the hydraulic circuit 8 comprises a tube 32 for introducing the detergent recovered from the washing chamber 2, into tank 21. Tube 32 is operatively interposed between the detergent recovery pump 31 and the washing chamber 2. According to one embodiment, pump 31 is a 12V pump.

According to one embodiment, machine 1 comprises a connecting element 33 for connecting machine 1 to a power supply network. The connecting element 33 preferably allows the connection to a 220V electrical supply source. According to one embodiment, machine 1 comprises an electric transformer (not depicted) operatively connected to the connecting element 33. Such an electric transformer preferably is a transformer adapted to transform a 220V inlet voltage into a 12V outlet voltage.

According to one embodiment, machine 1 comprises a connection 34 for the introduction of the mains water, which connection comprises the inlet port 5.

According to one embodiment, machine 1 comprises a connection 35 for the forced discharge of the washing liquid, which connection comprises the discharging port 6.

According to one embodiment, machine 1 comprises an overflow port 36.

According to one embodiment, machine 1 comprises at least one support element 37 for resting machine 1 on a support surface. The at least one support element 37 is preferably made of rubber to damp the vibrations during the operation of machine 1. The at least one support element 37 preferably comprises a plurality of support feet 37, by way of non-limiting example, four support feet 37.

According to one embodiment, machine 1 comprises a control member 38, preferably a control button 38, which is operatively connected to the control unit 20 and is operable to start/interrupt a wash cycle of machine 1.

According to one embodiment, machine 1 comprises a signaling device 39 adapted to signal the start of a wash cycle of machine 1. The signaling device 39 preferably comprises a start cycle signaling LED, preferably a LED adapted to emit a green light.

According to one embodiment, machine 1 comprises a signaling device 40 adapted to signal the end of a wash cycle of machine 1. The signaling device 40 preferably comprises an end cycle signaling LED, preferably a LED adapted to emit a red light.

Having described the structure of a machine according to the present description, now a currently preferred operating mode of machine 1 is described by way of non-limiting example with reference to the embodiment shown in the accompanying drawings.

After introducing the dirty cartridge cases into the washing chamber 2, the operating motor 11 is actuated by means of the control unit 20. Motor 11 puts the rotating body 9 into rotation, which moves the cartridge cases by means of the related fins 10. Then the control unit 20 actuates the washing liquid inlet valve 25 which allows the washing liquid, preferably mains water, to enter, which is used for prewashing the cartridge cases. Valve 25 is preferably opened for 30 seconds, after which time it is closed again. Then the control unit 20 actuates the extraction pump 27 to discharge the washing liquid. The extraction pump 27 is preferably disabled after 40 seconds. Then the control unit 20 actuates the detergent drawing pump 29 to introduce the detergent into the washing chamber 2. The drawing pump 29 is preferably disabled after 40 seconds. Then a wash cycle with rotation of the rotating body 9 is carried out, preferably for 120 seconds. Such a wash cycle is preferably carried out with a slow rotation of the rotating body 9. Then the control unit 20 actuates the detergent recovery pump 31 so as to reintroduce the detergent into tank 21. Pump 31 is preferably disabled after 40 seconds. Then the control unit 20 actuates the washing liquid inlet valve 25 so as to allow the washing liquid to enter into the washing chamber 2 in order to carry out the rinsing of the cartridge cases. Valve 25 is preferably closed for 30 seconds. Then the control unit actuates the extraction pump 27 to discharge the washing liquid. The extraction pump 27 is preferably disabled after 30 seconds. Then the control unit 20 actuates heater 12 to dry the cartridge cases. Heater 12 is preferably disabled after 360 seconds. Then the control unit 20 disables the operating motor 11. At this point, the wash and drying cycle of the cartridge cases is complete and the control unit 20 preferably actuates the opening of door 7. It is worth noting that the rotating body 9 is preferably kept in rotation for the whole duration of the wash cycle up to the end of the wash cycle.

According to one embodiment, the spent detergent may be discharged by means of tap 23 after 20 wash cycles have been carried out.

Generalizing what is described above, practically there was described also a method for washing and drying various caliber cartridge cases for guns or rifles, comprising:

a) a step of providing a portable machine (1) comprising:
  - a washing chamber (2) having a cylindrical side wall (3), said washing chamber (2) comprising a cartridge case introduction opening (4);
  - an inlet port (5) for a washing liquid;
  - a discharging port (6) for the washing liquid;
  - a door (7) configured to hermetically close said cartridge case introduction opening (4),
  - a hydraulic circuit (8) operatively connected to the washing chamber (2) and to said inlet and discharging ports (5, 6), the hydraulic circuit (8) being configured to allow the washing liquid to enter into the washing chamber (2) by means of said inlet port (5), and the washing liquid extracted from the washing chamber (2) to be discharged by means of said discharging port (6);
  - a rotating body (9) arranged in the washing chamber (2) to rotate about a rotation axis (X1), said rotating body (9) comprising at least one cartridge case movement element (10) which is integral in rotation with the rotating body (9), said at least one movement element (10) protruding into the washing chamber (2) and being configured to repeatedly lift and release the cartridge cases in the washing chamber (2) during the rotation of the rotating body (9);
  - an operating motor (11) operatively connected to the rotating body (9) so as to allow the rotation of the rotating body (9) about said rotation axis with respect to the washing chamber (2);
  - a drying device (12) arranged to dry the cartridge cases in the washing chamber (2);

b) a step of introducing said cartridge cases into said washing chamber;

c) a step of washing said cartridge cases by moving said cartridge cases by means of said at least one movement element (10);

d) a step of drying said cartridge cases in the washing chamber (2) by means of said drying device.

As described above, it may thus be understood how a portable machine for washing and drying various caliber cartridge cases for guns or rifles of the type described above allows the above-mentioned objects to be achieved with reference to the known art.

In particular, it is worth noting that a machine according to the present invention allows a particularly effective washing and drying of the cartridge cases in a completely automatic manner. The automatism thereof indeed allows the machine to be switched off at cycle end and for the cartridge cases to be completely cleaned and dried, ready for a new reloading. Moreover, the particularly short wash cycle with respect to that of the machines of the known art described above allows saving power. Again, the possibility of recovering detergent reduces the impact on environmental pollution and allows savings from an economical viewpoint.

The principle of the invention being understood, the embodiments and manufacturing details may largely vary with respect to those described and shown by mere way of non-limiting example, without departing from the scope of the invention as defined in the appended claims.

The invention claimed is:

1. A portable machine for washing and drying various caliber cartridge cases for gun or rifle, the portable machine comprising:
  - a washing chamber having a cylindrical side wall, the washing chamber comprising a cartridge case introduction opening;
  - an inlet port for a washing liquid;
  - a discharging port for the washing liquid;
  - a door configured to hermetically close the cartridge case introduction opening;
  - a hydraulic circuit operatively connected to the washing chamber and to the inlet and discharging ports, the hydraulic circuit configured to allow the washing liquid to enter into the washing chamber by means of the inlet port, and the washing liquid extracted from the washing chamber to be discharged by means of the discharging port;

a rotating body arranged in the washing chamber to rotate about a rotation axis, the rotating body comprising at least one cartridge case movement element that is integral in rotation with the rotating body, the at least one movement element protruding into the washing chamber and configured to repeatedly lift and release the cartridge cases in the washing chamber during the rotation of the rotating body, wherein the rotating body further comprises a first annular end portion and a second, opposing annular end portion, wherein the at least one cartridge case movement element is connected to the first and second annular end portions and comprises a plurality of cartridge case movement elements, the rotating body further comprising a plurality of side through openings, wherein a periphery of each of the plurality of side through openings respectively includes a respective pair of cartridge case movement elements, the first annular end portion, and the second annular end portion;

an operating motor operatively connected to the rotating body to allow the rotation of the rotating body about the rotation axis with respect to the washing chamber; and a drying device arranged to dry the cartridge cases in the washing chamber.

2. The portable machine for washing and drying cartridge cases according to claim 1, wherein the at least one cartridge case movement element is arranged adjacent to the cylindrical side wall of the washing chamber.

3. The portable machine for washing and drying cartridge cases according to claim 1, wherein the at least one cartridge case movement element comprises a plurality of cartridge case movement elements.

4. The portable machine for washing and drying cartridge cases according to claim 1, wherein the at least one cartridge case movement element comprises at least one longitudinal movement fin.

5. The portable machine for washing and drying cartridge cases according to claim 4, wherein the at least one longitudinal movement fin is a straight fin that extends parallel to the rotation axis.

6. The portable machine for washing and drying cartridge cases according to claim 1, wherein the first annular end portion and the second annular end portion are arranged orthogonal with respect to the rotation axis.

7. The portable machine for washing and drying cartridge cases according to claim 1, wherein the rotation axis is a horizontal axis.

8. The portable machine for washing and drying cartridge cases according to claim 1, wherein the cartridge cases are brass cartridge cases.

9. A method for washing and drying various caliber cartridge cases for gun or rifle, the method comprising:

a) providing a portable machine that comprises:

a washing chamber having a cylindrical side wall, the washing chamber comprising a cartridge case introduction opening;

an inlet port for a washing liquid;

a discharging port for the washing liquid;

a door configured to hermetically close the cartridge case introduction opening;

a hydraulic circuit operatively connected to the washing chamber and to the inlet and discharging ports, the hydraulic circuit configured to allow the washing liquid to enter into the washing chamber by means of the inlet port, and the washing liquid extracted from the washing chamber to be discharged by means of the discharging port;

a rotating body arranged in the washing chamber to rotate about a rotation axis, the rotating body comprising at least one cartridge case movement element that is integral in rotation with the rotating body, the at least one movement element protruding into the washing chamber and configured to repeatedly lift and release the cartridge cases in the washing chamber during the rotation of the rotating body, wherein the rotating body further comprises a first annular end portion and a second, opposing annular end portion, wherein the at least one cartridge case movement element is connected to the first and second annular end portions and comprises a plurality of cartridge case movement elements, the rotating body further comprising a plurality of side through openings, wherein a periphery of each of the plurality of side through openings respectively includes a respective pair of cartridge case movement elements, the first annular end portion, and the second annular end portion;

an operating motor operatively connected to the rotating body to allow the rotation of the rotating body about the rotation axis with respect to the washing chamber; and a drying device arranged to dry the cartridge cases in the washing chamber;

b) introducing the cartridge cases into the washing chamber;

c) washing the cartridge cases by moving the cartridge cases using the at least one movement element; and d) drying the cartridge cases in the washing chamber using the drying device.

* * * * *